United States Patent [19]
Adiletta et al.

[11] Patent Number: 5,277,943
[45] Date of Patent: Jan. 11, 1994

[54] THERMAL BLEACHING PROCESS FOR NON-CONTAMINATING FLUOROCARBON FIBER MEDIA

[75] Inventors: Joseph G. Adiletta, Thompson, Conn.; John L. Hurley; Sandra L. Brosious, both of Cortland, N.Y.

[73] Assignee: Pall Corporation, Glen Cove, N.Y.

[21] Appl. No.: 906,366

[22] Filed: Jun. 30, 1992

[51] Int. Cl.$^5$ .............................. D02G 3/00; C08J 9/00
[52] U.S. Cl. ...................................... 428/375; 521/50
[58] Field of Search ........................... 428/375; 521/50

[56] References Cited

U.S. PATENT DOCUMENTS 4,465,797  8/1984  Brownscombe et al. ............ 523/216
4,716,074  12/1987  Hurley et al. ....................... 428/220

OTHER PUBLICATIONS

Excerpt concerning Triton X100; "Encyclopedia of Surface Active Agents", Sisley, Chemical Publishing Company, (1961).

Primary Examiner—John Kight, III
Assistant Examiner—T. Mosley
Attorney, Agent, or Firm—Leydig, Voit & Mayer

[57] ABSTRACT

A process for reducing the level of extractables, whitening, and rendering a porous material non-contaminating where the porous material is comprised of bonded fluorocarbon fibers and a fluorocarbon chemical binder. The thermal bleaching process includes exposing the material for at least several hours to a vigorously agitated oxygen-containing atmosphere maintained at a temperature of at least 400° F.

46 Claims, No Drawings

THERMAL BLEACHING PROCESS FOR NON-CONTAMINATING FLUOROCARBON FIBER MEDIA

TECHNICAL FIELD

This invention relates to substantially permanently whitened fluorocarbon fiber based filters and to a method for rendering a chemically bonded fluorocarbon fiber media substantially non-contaminating by reducing the level of extractables to a minimal level. The invention provides a filter medium and residue extraction/bleaching techniques therefor. The invention has particular application in significantly reducing the level of undesired extractables from filters composed of non-woven or woven polytetrafluoroethylene fibers which are fabricated using wetted fluorocarbon binders.

BACKGROUND ART

Polytetrafluoroethylene (PTFE or Teflon ®) filters have long been used for a variety of applications. For example, porous filters prepared from PTFE fibers which are laid-down with fluorocarbon polymer binders and then cured, find use in filtration of hot, acidic or caustic fluids. Due to production techniques, staple untreated PTFE fibers of the type used in filters typically are dark brown color because of carbonaceous residue. When incorporated into filtration structures, fibers containing such residues not only are aesthetically undesirable but also present a source for potential contamination of the filtrate.

The following definitions are provided to facilitate an understanding of the invention.

"Bleaching" means reduction of extractable contaminants as well as whitening. Bleaching refers to processes of removing the carbonaceous residues from the fibers and from the filter structure following laydown which may typically be present in amounts as high as about 3 weight percent of the staple fibers and about 2 weight percent of the total weight of a chemically bonded filter media (fluorocarbon binder and unbleached fibers).

"PTFE" means polytetrafluoroethylene.

"FEP" means fluorinated ethylene propylene copolymer.

"PFA" means perfluoroalkoxy polymer.

"Set" or "cure" refers to the binder taking on the desired configuration on the fibers to provide the desired structural integrity.

"Fugitive" refers to a dispersion solution composition which is volatilized, decomposed, and/or removed substantially completely prior to or during drying and curing so as to be essentially absent from a finished structure and not increase the level of extractables in the finished fibrous structure.

With reference to the background art, Hurley et al (Pall Corporation), in U.S. Pat. No. 4,716,074 (hereinafter Hurley et al.), describe a process for making a filter incorporating fibers with a reduced level of contaminating residues. Hurley et al, sets out manufacturing procedures for PTFE fiber-based filters which involve the following steps: 1) selecting the PTFE fibers; 2) selecting a fluorocarbon binder; 3) bleaching and pre-shrinking the fibers; 4) forming a stabilized dispersion of the fibers and a fugitive binder; 5) laying down the dispersion; 6) drying the dispersion; 7) applying the fluorocarbon binder to the laydown; 8) drying the laydown; 9) curing the binder coated laydown; and, finally, 10) treating the laydown to remove extractables.

Suitable polytetrafluoroethylene (PTFE) fibers described in Hurley et al. typically have diameters ranging from about 5 to about 50 micrometers, preferably from about 15 to about 35 micrometers, and have lengths ranging from about 1,000 to about 20,000 micrometers, preferably from about 4,500 to about 8,500 micrometers. Fibers outside those ranges can be used, but with less success. For example, fibers having diameters greater than about 50 micrometers and longer than about 20,000 micrometers cannot be used to form relatively thin material. Unless relatively thick material is desired, the fibers should not exceed those dimensions. Also, where the aspect ratio (ratio of length to diameter) is lower than about 100, there is insufficient crossing and interlacing among the fibers to provide the requisite strength in the resulting material. Accordingly, fibers with aspect ratios of at least about 100 are used. If the fibers have diameters less than about 5 micrometers, they (1) tend to break up during dispersion, thereby decreasing their aspect ratio and yielding a material having reduced void volume as well as reduced strength, and (2) tend to have high resistance to flow of liquids. PTFE fibers of the desired type are commercially available, e.g., from E. I. DuPont de Nemours and Company, Inc.

In Hurley et al., the fluorocarbon polymer binders include fluorinated ethylene-propylene copolymers, and particularly copolymers of tetrafluoroethylene (TFE) and hexafluoropropylene referred to as FEP. Other fluorocarbon binders such as perfluoroalkoxy polymer ("PFA") may be used so long as they exhibit the desired resistance to high temperatures and caustic chemical environments and provide the requisite bonding of the PTFE fibers upon curing.

An emulsion/suspension incorporating the binder is used. The concentration of the fluorocarbon binder (weight percent solids) in the emulsion as supplied is typically in the range of from about 45 to to about 65 weight percent. The particles of the fluorocarbon polymer binder in the emulsion generally have sizes in the range of from about 0.05 to about 1.0 micrometer, preferably 0.1 to about 0.4 micrometer. The dispersions are generally aqueous and typically contain from 3 to 12%, more typically 5 to 7%, by weight of volatile nonionic and anionic wetting agents. The dispersions are generally diluted with water before use, typically to 0.5 to 25% by weight or higher, more preferably from about 5% to about 15% by weight, of the fluorocarbon binder.

Appropriate wetting agents include ethoxylated alkyl phenol, alkaryl polyether alcohol (Triton X100, available from Rohm & Haas Company).

The fluorocarbon binder is required to set or cure before any substantial shrinkage or melting of the PTFE fibers occurs. For this reason, thermoplastic fluorocarbon binders having a proper melting point range, such as FEP, are preferred. A particularly preferred FEP fluorocarbon polymer binder is FEP 120 available from E. I, DuPont de Nemours and Company, Inc. In dispersion form, a thermoplastic resin like FEP is set or cured by flowing the resin over the fibers to coat them and heating the dispersion to cause the fibers to adhere to one another at crossover points.

As noted in Hurley et al, because of carbonaceous residues remaining from their manufacture, staple PTFE fibers are typically a rich, chocolate brown color. Aesthetically, this is undesirable in filters, filter support and drainage structures. If not removed, the carbonaceous residues remain in the filter structure as extractables, i.e., materials which can leach from the filter structure during service.

Accordingly, Hurley et al. recite alternative fiber bleaching/whitening methods practiced before the fibers are subject to laydown. The first is by chemical means, e.g., by heating the fibers in concentrated sulfuric acid heated to approximately 600° F. to which is added slowly concentrated nitric acid until the fibers turn white. The second, preferred, method is thermal bleaching of the substrate fibers before laydown. Thermal bleaching of the fibers is accomplished, e.g., by gradually increasing the air temperature over an extended period of time from about 450° F. up to about 570° F. and maintaining such temperature for several hours until the fibers are substantially free of carbonaceous material (whitened). Hurley et al point out that thermal bleaching will typically result in a shortening of the fibers and an increase in their diameter. Depending on the desired size of the fibers in the formed structure, the fibers can be chopped to the desired length before or after their thermal bleaching.

The bleached fibers are used in a stabilized dispersion used to prepare the porous structures. The dispersion is comprised of a liquid carrier medium, the bleached PTFE fibers, and a stabilizing agent. A single constituent may serve to both stabilize the dispersion of PTFE fibers and, upon drying, to bind the fibers to each other, thereby providing green strength. The stabilizing agent is mixed with the liquid carrier medium, preferably water, in an amount such as to provide the requisite concentration and until a uniform dispersion is obtained. Then the bleached PTFE fibers, in appropriate amount, are then added and mixed to provide a uniform dispersion or suspension of the fibers in the liquid medium. The fiber containing dispersion is stabilized, i.e., the PTFE fibers remain in suspension and will not settle out at a rate fast enough to adversely affect the laydown of the dispersion.

Hurley et al also describe the use of a stabilizing agent to increase dispersion viscosity. For example, with Carbopol 941 (a polyacrylic acid available from B. F. Goodrich Chemicals Company), the addition of a neutralizing base, ammonium hydroxide, serves to neutralize the polyacrylic acid and increase the viscosity substantially, e.g., to about 800 to 20,000 centipoise. Such systems are very thixotropic. When vigorously agitated, they have a low effective viscosity and, hence, are very effective in dispersing the PTFE fibers. Since these dispersions are very stable, they may be prepared in advance of the time they are used without settling out of the fibers.

Carbopol 941 may be used without the addition of a neutralizing base, albeit addition of a neutralizing base is preferred. When a neutralizing base is not used, more of the Carbopol must be added to achieve the desired viscosity. Viscosities in the range of from about 800 to about 20,000, preferably in the range of 1,200 to 6,000, centipoise may be used.

Also, a fugitive binder may be introduced into the fiber dispersion to give the laydown sufficient strength to withstand handling until curing of the fluorocarbon binder is effected. Both the stabilizing agent and the fugitive binder, if used, preferably are fugitive but may require separate treatment for removal. Preferably Carbopol, particularly Carbopol 934, Carbopol 940, and Carbopol 941 is used since it provides a single component which acts as both a fugitive stabilizer and fugitive binder.

Hurley et al. describe that the amount of PTFE fibers present in the stabilized dispersion should be such that a uniform and complete dispersion is achieved with the minimum amount of water. Generally from about 0.5 to about 20, and preferably from about 1 to about 5, grams of fibers per liter of the dispersion comprising the stabilizing agent, liquid carrier, and fiber mixture is satisfactory. Lower amounts can be used, but are less economical. Higher amounts are more difficult to disperse and may lead to clumping or aggregation of the fibers and a non-uniform laydown.

The amount of stabilizing agent/binder varies according to the particular agent chosen, but in every case it should be sufficient to provide a stabilized dispersion as described above. Typically, mixtures of the liquid medium and stabilizing agent have viscosities of from about 800 to about 20,000, and preferably from about 1,200 to about 6,000, centipoise, prior to incorporation of the fibers. Generally, from about 0.4 to about 4 grams per liter of the stabilizing agent/binder and, preferably, from about 1 to about 2 grams per liter of the liquid carrier and stabilizing agent/binder mixture are sufficient.

The dispersion is prepared with conventional equipment, e.g., a baffled Cowles mixer or beater. Generally, beating at a tip speed of from about 3,000 to about 4,500 feet per minute for from about 30 to about 120 minutes is sufficient to produce a uniform, complete dispersion of the fibers. Excessive tip speed and mixing times are not desirable due to a loss in viscosity caused by shearing of the molecules of the stabilizing agent. The surface tension of solutions of the desired characteristics which have been thickened with Carbopol is above 70 dynes per centimeter and was measured as 74.2 dynes per centimeter for a 1.4 grams per liter of Carbopol 941 mixture.

Hurley et al. describe that the stabilized dispersion may be laid down on any suitable porous support, e.g., a woven glass cloth or wire mesh. The laydown should be of uniform thickness and spreading means may be employed for that purpose. Excess liquid carrier then is drained from the laydown, preferably by drawing a vacuum through the support. Conventional equipment, such as a Fourdrinier, may be used. To avoid premature and uneven drainage of the laydown, an impervious sheet, such as a plastic sheet, may be placed over the porous support prior to laydown of the dispersion. After distribution of the dispersion over the support, the plastic sheet is removed and the liquid is drained.

The next step discussed in Hurley et al. is drying the laydown before application of the fluorocarbon polymer binder. Drying is accomplished by drawing ambient or warmed air through the laydown, by infrared radiation or with conventional oven equipment. With an infrared heater, 6 to 9 minutes is satisfactory when operated at about 6 watts per square inch of the fibrous structure laydown at a distance of 3 to 4 inches.

In Hurley et al., the fluorocarbon binder emulsion is applied to the laydown by spraying, dipping, or other conventional techniques. The amount of fluorocarbon binder emulsion applied varies according to the concentration of the fluorocarbon binder in the emulsion. The concentration of the emulsion and the amount of emulsion applied to the laydown, whether in a single application or in multiple applications, must be such that sufficient amounts of fluorocarbon binder are provided to ensure adequate bonding of fiber-to-fiber contacts to impart structural integrity to the resulting fibrous structure. Also since wicking can occur, it may be desirable to undertake multiple binder emulsion steps.

As delineated in Hurley et al., the amount of fluorocarbon binder distributed in the final product, i.e., the porous fibrous structure, generally ranges from about 5 to about 45, preferably from about 10 to about 35, weight percent based on the weight of fibers. Amounts below 5 weight percent may be used, however, when less binding is required. Undesirable webbing, the formation of polymer films, generally results from amounts greater than 45 weight percent.

The binder impregnated laydown is again dried after binder application. The fluorocarbon impregnated fluorocarbon fiber structure is cured by heating at a higher temperature than is required for drying. For thermoplastic fluorocarbon binders the curing temperature and time should be such that the fluorocarbon binder is allowed to melt and flow. For example, when FEP is used, setting or curing will be carried out typically at from about 515° F. to about 650° F. for from about 20 seconds to about 1 minute.

Finally, Hurley et al. discuss the problems of introduction of extractables into the filter media by the various laydown constituents. To the extent that extractables are introduced by the stabilizing agent, and fugitive binder, if used, any residual surfactant from the fluorocarbon dispersion, etc., Hurley et al, rely on an acid extractables reduction step to reduce the level of extractables. The acid extractables reduction step involves exposure of the cured laydown to heated mineral acid, such as 70% reagent grade nitric acid at 230. to 250 F for five hours followed by rinsing with pure water and drying of the structure.

While nitric acid is an effective way to whiten the medium it is not without significant drawbacks. For example, three basic difficulties have been observed. First, the white color is reversible in subsequent manufacturing steps and in filter service. The medium discolors when heated to temperatures in excess of approximately 250° F. This tendency to discolor causes manufacturing problems as, for example, in side sealing and end capping operations. The color depends upon the maximum processing temperature. After placement into service where the service temperatures exceed 250° F. the filter medium discolors. The color that develops varies from tan through various shades of brown to a purplish hue. The reappearance of color in the medium is indicative of the presence of organic compounds and/or decomposition products which remain in the medium and which have the potential to be extracted in service.

Secondly, reliance on repeated rinsing that removes most but not substantially all of the nitrate ions is generally unsatisfactory under the increasingly stringent standards of industry. Quality specifications now often require that the level of total extractables, especially for nitrate ions, be reduced dramatically, e.g. even below 53 ppb/ft$^2$. Further sequential rinsing of the medium to lower extractable nitrate levels introduces other problems. Since the medium is hygroscopic, prone to dewet, after rinsing and drying, it must be rewet with a low surface tension organic liquid such as isopropyl alcohol often at the start of each step which involves additional labor. Moreover, the volume of deionized water contaminated with nitrate and organic wastes, alcohol, introduce increased waste disposal concerns and must be properly discarded or reprocessed.

Thirdly, residual nitrates not only contribute to filter medium discoloration but also have the potential to contaminate the filtrate when place in service. Even the most thorough rinsing of the medium does not eliminate the residual nitrate levels to below the range of several hundred to a few thousand ppb/ft$^2$.

Neither the PTFE (fibers) nor the fluorocarbon binder, themselves, are discoloring. It is, in fact, the processing aids that cause the discoloration/contamination problems. The wetting agent in the binder and to a lesser degree the dispersant and stabilizer/fugitive binder have been found to be the sources of discoloration. These processing aids are necessary but should be removed entirely once they have served their purposes. However, due to fusion of the binder with heat, these processing aids and residues therefrom are entrained in the fused fluorocarbon of the laiddown medium. These undesirable, entrained constituents must be removed to prevent discoloration of the filter medium and to prevent potential contamination in service.

As a substitute for the above-described nitric acid bleaching step, bleaching with hot Hydrogen Peroxide (30%) has been attempted. Unfortunately, it is not as effective a bleaching agent as nitric acid. Like nitric acid, it poses safety and disposal issues. Hot hydrogen peroxide can produce uncontrolled decomposition reactions which are also potential sources of contamination. Color returns upon moderate heating.

Conventionally, heat treatment after laydown was shunned because of the prospect of fiber shrinkage, breaking the fiber cross-over bonds created with the fluorocarbon binder, and reducing the strength and structural integrity of the filter media. The prior art specifically avoided prolonged exposure of fluorocarbon fiber based media to high temperatures since it was believed that after laydown, the fiber shrinkage adversely impacted on filter integrity.

Convention also dictated that protracted exposure to high temperatures would lead to extensive shrinkage of the medium and that the thickness of the medium would be unacceptably decreased. Given the prerequisite that the medium possess a high void volume, the prospect of a substantial reduction of medium volume deterred high temperature treatment. Furthermore, and particularly applicable to fluorocarbon media, there was a concern that protracted exposure to high temperatures would lead to unacceptably high fluoride extractable levels.

Finally, since media bleached with nitric acid and hydrogen peroxide discolored when heated to high temperatures, it did not appear reasonable to employ high temperature exposure to bleach the medium.

DISCLOSURE OF THE INVENTION

Contrary to conventional belief and to overcome the problems with discoloration and leaching of extractables in service, both being associated with post-laydown treatments, this invention provides a thermal bleaching process involving prolonged exposure to high temperatures for a fluorocarbon binder/PTFE fiber filter media.

The subject invention provides a filter media and a process for reducing the level of ionic extractables in a porous material comprised of fluorocarbon fibers and a fluorocarbon binder. The invention comprises exposing porous fluorocarbon bonded fluorocarbon fiber material to an oxygen-containing atmosphere that is maintained at a temperature of at least about 480° F. for a period of time sufficient to reduce the level of ionic extractables in the porous material.

The invention also provides a fibrous porous structure comprising chemically bonded fluorinated polymeric fibers bonded with a binder selected from the group consisting of fluorinated ethylene propylene copolymer, perfluoroalkoxy polymer and mixtures thereof, where the fibrous porous structure has a total extractables level of less than about 53 ppb/ft$^2$.

This invention provides a filter media possessing a substantially permanent white color composed, preferably, of pre-shrunken fluorocarbon fibers and fluorocarbon binders. The white color results from the novel final thermal bleaching process which removes undesirable laydown processing aids and by-products from the media. The processing aids, including dispersion stabilizers, fugitive binders, and fluorocarbon wetting agents, introduce an undesirably high level of extractable residues into the filter media. The conventional post-laydown chemical treatments which may reduce the level of the carbonaceous extractables, introduce other extractables that have a tendency to cause discoloration and contamination in service. In service, an originally white-colored filter media is often exposed to caustic environments at elevated temperatures which induces degradation of contaminating extractables and leads to discoloration of the filter media.

This invention substantially removes the processing aids and by-products comprising the discoloring extractables from the fluorocarbon binder. Removal is achieved by protracted exposure to a hot oxygenated atmosphere (air, oxygen enriched air, or oxygen). This invention recognizes that heat, the primary cause of discoloration of chemically treated fluorocarbon filter media in service is also the solution to the discoloration problem. As a result of protracted exposure of the bound filter media at a controlled temperature to a hot, oxygen-containing atmosphere (air), the produced medium retains a stable white color even at elevated service temperatures. It is hypothesized that the oxygen in the hot air reacts (oxidizes) over time with substantially all the processing aid(s) and any resultant decomposition products. Protracted exposure time is necessary to insure diffusion through the fluoropolymer bound PTFE fibers.

This invention, in preferred practice, contemplates isolating the filter media in an oven with efficient temperature control and vigorous atmospheric agitation means to maximize oxygen per volume exposure. The invention also contemplates loosely wrapping (or stacking) the media in the oven and minimizing the possibilities of contamination of the media during bleaching by avoiding direct contact between it and metal surfaces. Practice of this invention provides a medium that is non-contaminating during manufacture since bleaching is accomplished without acids, peroxides or other reagents. Furthermore, the produced medium is non-contaminating in service due to the relatively lower level of extractable species. (The level of nitrate ions is two to three orders of magnitude lower than that obtained from nitric acid bleaching followed by extensive rinsing).

DETAILED DESCRIPTION OF EMBODIMENTS OF THE INVENTION

As recited in the Background of the Invention, above, the PTFE fibers, fluorocarbon binders, processing aids, as well as the dispersion forming, and laydown techniques described in Hurley et al. U.S. Pat. No. 4,716,074 are applicable herein. Therefore, U.S. Pat. No. 4,716,074 is incorporated herein by reference. However, this invention departs from the teachings of Hurley et al., primarily in respect to the final laydown acid treatment extractable reduction step.

The media of this invention is composed of the above-described PTFE fibers and a fluorocarbon binder with associated processing aids (wetting agent, stabilizers, fugitive binders, etc.). The media is commercially available in form of fluorocarbon bound PTFE fiber filters from Pall Corporation under the names CHEMINERT TM, SUPER CHEMINERT TM, and PALLFLEX TM.

Certain techniques described in Hurley et al., e.g., bleaching and/or pre-shrinking fibers, forming a stabilized dispersion, laydown of the dispersion, applying the binder, etc. are applicable to the instant invention. However, Hurley et al. recite the need for preliminary fiber bleaching before laydown. Although, it is preferred to use pre-bleached fluorocarbon fibers in this invention, pre-bleaching is not necessary. Fibers can be used without pre-bleaching or pre-shrinking. Pre-shrinking renders the fibers more dimensionally heat stable and, thus, reduces the amount of fiber shrinkage after fusing with the binder. Thus, medium volume loss upon exposure to temperatures exceeding the fiber crystalline transition (softening) temperature is minimized.

FEP is the preferred binder but PFA and PFA/FEP mixtures alone or with PTFE provide a satisfactory fluorocarbon binder in the practice of this invention. Because of the higher crystalline melting points of PFA and PTFE, their addition increases the thermal stability of FEP. However, raising the melting point of the binder also reduces the temperature range between the softening point of the binder and the melting point of the PTFE fibers. Thus, it is more difficult to achieve the initial thermal cure, fusing of the fibers at the cross-over points, of the media. Thermal fusion of FEP and the FEP combinations to the fibers is generally carried out typically at from about 515° F. to about 750° F. for from about 20 seconds to about 5 minutes.

The preferred wetting agent for the binder is nonionic alkylaryl polyether alcohol (ethoxylated alkyl phenol) Triton X100. Anionic wetting agents such as Triton X200 (Sodium alkylaryl polyether sulfonate) or Triton X300 Sodium alkylphenoxy polyether sulfate) can also be used.

The preferred porous media for practice of this invention is the above-described, non-woven polytetrafluoroethylene (PTFE) fibers. However, the invention is applicable to bleaching a woven fabric of PTFE fibers which are bound into a selected configuration with a chemical binder. If the material is, for example, woven PTFE yarn, then the foregoing steps relating to formation of the dispersion, laydown and drying the laydown, are not applicable.

For the purpose of this invention, the maximum bleaching temperature depends on the crystalline melting point of the selected fluorocarbon binder. For example, if the binder is either FEP or PFA, the preferred maximum temperature is 725° F. and the preferred temperature is 535° F. The minimum temperature for the thermal bleaching process of this invention is 400° F. and the minimum bleaching time is several hours, but preferably 48 Hours. More typically, the bleaching time will range from 60 to 300 hours since multilayers of the filter medium are being bleached simultaneously.

Measurable weight loss by the medium results from the hot air treatment of this invention. The amount of wetting aid present in the medium, as originally manufactured can be relatively high. For example, the amount of binder present may be 50% of the weight of the fibers and the wetting agent in the binder may he present in concentrations of 5 or 6% based on weight of FEP. The hot air treatment is effective in removing the wetting agent and other additives. There is a typical weight loss of 0.80 percent with a medium that has a relatively low binder content. A higher weight loss, 1.33 percent, is observed for a medium with higher binder content. Removal of these processing aids is essential—otherwise, they can leach out an act as contaminants in service.

In order to practice this invention, a thermal isolation chamber is required. Preferably, the chamber is in the form of a convection oven which has sensitive temperature control means to maintain the temperature in the oven within a relatively tightly controlled range, e.g., an Electroven H1000. An electric heat source is preferred but gas or oil fired heat is acceptable if the heat is indirect, i.e., via heat transfer coils and the like.

It is preferred that the oven contain means for atmospheric circulation and, preferably, vigorous agitation, e.g. fans. The vigorous agitation of the chamber atmosphere (air) not only helps to control and maintain substantially a uniform temperature within the chamber but also it maximizes media surface exposure to a renewed supply of the bleaching/extractable removing air. It is believed that the resident time of the bleaching air in the chamber is not a significant factor. An exposure time of three to ten days is generally required when the bleaching temperature of 530° F. is used in an Electroven Model H1000. The used, hot air is then vented from the chamber to the outside. Another expedient to promote uniform heat distribution is the use of radiation shields interposed between the electric heat source and the filter medium. Interposing simple heat deflecting metal or ceramic baffles between the source and the medium, prevents undue heat concentration leading to uneven bleaching and local "melting" of the medium.

The preferred bleaching atmosphere contains oxygen. Due to availability and cost, filtered ambient air is preferred. Other oxidizing gases can supplement or actually replace the air. This would include, but not be limited to, water vapor, ozone, carbon dioxide, sulfur dioxide, etc. Furthermore, if desired, the oxygen content of the atmosphere can be supplemented with the addition of oxygen from a pure oxygen supply (a compressed oxygen bottle). A concentrated (pure) oxygen atmosphere can be used for this invention since it would provide for very efficient bleaching. However, a concentrated oxygen atmosphere is not suggested for safety and cost reasons.

To prevent introduction of foreign matter into the oven, it is important that ambient air be filtered before introduction. A HEPA (high efficiency particulate air) filter has a sufficient removal rating to prevent introduction of foreign, potentially contaminating, particles to the bleaching media.

The placement or positioning of the medium in the oven is also important. The entire volume of the medium must be readily accessible to the circulating air. Therefore, if in multilayer form, the medium should not be tightly, but loosely, stacked in the oven. If in the form of rolls, the fibrous medium should be "loosely" rolled to facilitate oxygen permeation. The force needed to unroll the medium after hot air bleaching is highly dependent upon how loosely or tightly the medium was rolled. Force is minimized when the medium is rolled. Thus, some "slack" should be present when the medium is in roll form. Effective bleaching of loosely rolled fibrous medium has been achieved with loose rolls containing in excess of 200 linear feet of medium.

Direct contact of the medium in the oven with metal components including stainless steel must be avoided due to metal complex formation. Such metal complex contamination can lead to in-service discoloration and filtrate contamination, Accordingly, the fibrous medium in direct contact with metal during the high temperature bleaching process, must be discarded. A simple expedient to overcome possible metal complex contamination is to interpose a layer (sheet) of porous fluoropolymer such as PTFE between the medium and any metal surface in the oven with which the medium may come into contact.

It has also been found that the media need not be in any particular orientation during bleaching. The medium can be successfully bleached in either horizontal or vertical positions. However, it is preferred that medium be in a horizontal orientation because it reduces the likelihood of buckling across the width of the medium. If in a horizontal orientation during bleaching, it is suggested that the underside of rolls be supported above the oven floor to promote uniform air penetration.

For example, an adjustable-radius, PTFE or flexible stainless steel hammock can be used to suspend rolls of medium within the oven. The adjustable radius hammock should be about a 1 inch larger radius than the roll it supports. As noted above, however, if a stainless steel hammock is used, it is necessary to discard the portions of the media which were in direct contact with the metal. As above, however, a sheet of PTFE can be interposed between the metal hammock and the medium to minimize waste.

The results from analysis of a multilayer filter medium subject to the hot air bleaching, without rinsing, process of this invention is presented in Table 1. The total reported extractables (35 versus 53 ppb/ft²) were reduced by 35%. When nitric acid is used to bleach the medium, the residual $NO_3$ level is typically in the range of 800-1500 ppb—even when rinsed extensively (48 hours or more).

TABLE 1

IONIC EXTRACTABLE LEVELS FOR TREATED
AND UNTREATED PALLFLEX TF2.75-50
SUPPORT AND DRAINAGE MATERIAL
IONIC EXTRACTABLE LEVEL* (ppb/ft²)

| ION | DETECTION LIMIT | AS RECEIVED (Unbleached) | TREATED (Bleached) |
|---|---|---|---|
| $F^-$ | 0.40 | 3.7 | 11 |
| $Cl^-$ | 0.078 | 1.5 | 2.0 |
| $NO_3^-$ | 0.12 | <DL | <DL |
| $SO_4^{-2}$ | 0.24 | 14 | 5.6 |
| $HPO_4^{-2}$ | 1.3 | <DL | <DL |
| $Na^+$ | 0.059 | 18 | 6.0 |
| $K^+$ | 0.12 | 14 | 4.2 |
| $Mg^{+2}$ | 0.22 | 0.45 | 0.52 |
| $Ca^{+2}$ | 0.61 | 1.4 | 4.8 |
| $Fe^{+3}$ | 0.039 | <DL | <DL |
| $Cu^{+2}$ | 0.059 | <DL | <DL |
| $Ni^{+2}$ | 0.12 | <DL | <DL |
| $Zn^{+2}$ | 0.22 | 0.31 | 0.86 |

TABLE 1-continued

IONIC EXTRACTABLE LEVELS FOR TREATED
AND UNTREATED PALLFLEX TF2.75-50
SUPPORT AND DRAINAGE MATERIAL
IONIC EXTRACTABLE LEVEL* (ppb/ft$^2$)

| ION | DETECTION LIMIT | AS RECEIVED (Unbleached) | TREATED (Bleached) |
|---|---|---|---|
| Co$^{+2}$ | 0.059 | <DL | <DL |

*Values corrected for control and average of two test pieces (areas given below)
<DL: If any, below detection limit
Areas used:
As Rec'd: 5.1 ft$^2$, 5.1 ft$^2$
Bleached: 5.1 ft$^2$, 3.5 ft$^2$

INDUSTRIAL APPLICABILITY

This invention defines a substantially permanently whitened, reduced-extractables, non-contaminating, fluorocarbon binder-fluorocarbon fiber filter media with adequate voids volume and manufacturing procedure therefor. The filters, according to this invention, do not discolor in service even in high temperature environments and provide analytical quality filtration. The level of extractables, such as nitrate ions, is on the order of two to three orders of magnitude lower than that obtained from conventional bleaching methods followed by extensive rinsing. The invention avoids the use of bleaching chemicals and minimizes waste water from rinsing. A weight loss (0.80-1.33%) occurs during hot air bleaching due to oxidation of processing aids.

The invention is particularly suitable for ultra-pure and analytical filtration operations used in, for example, the biochemical and chemical (analytical extraction), pharmaceutical (drug production) and electronics (microchip etching solution production) industries. Thus, for such applications, and others where contamination by extractables must be avoided, the bleaching process of this invention and the resulting bound fluorocarbon fiber media are particularly applicable.

While the foregoing disclosure describes specified embodiments, other embodiments, modifications, and variations contained within the spirit of the following claims will be apparent to the skilled artisan.

What is claimed is:

1. A process for reducing the level of ionic extractables in a porous material comprised of bonded fluorocarbon fibers and a binder, comprising exposing the porous material to an oxygen-containing atmosphere that is maintained at a temperature of at least about 400° F., for a period of time sufficient to reduce the level of ionic extractables in said porous material.

2. The process of claim 1 wherein the binder initially contains a wetting agent, prior to said exposure to an oxygen-containing atmosphere.

3. The process of claim 2 wherein the wetting agent is a nonionic surfactant and the binder is selected from the group consisting of fluorinated ethylene propylene copolymer, perfluoroalkoxy polymer, and mixtures thereof.

4. The process of claim 3 wherein the wetting agent is an ethoxylated alkyl phenol.

5. The process of claim 1 wherein the bonded fluorocarbon fibers are subjected to bleaching prior to being incorporated into the porous material.

6. The process of claim 1 wherein the porous material is comprised of non-woven fluorocarbon fibers that have been bonded with a binding composition comprising a binding agent and a wetting agent.

7. The process of claim 6 wherein the wetting agent includes a nonionic surfactant.

8. The process of claim 7 wherein the wetting agent includes an ethoxylated alkyl phenol.

9. The process of claim 6 wherein the binding agent includes a fluorinated binder.

10. The process of claim 7 wherein the binding agent is selected from the group consisting of fluorinated ethylene propylene copolymer, perfluoroalkoxy polymer and mixtures thereof.

11. The process of claim 8 wherein the binding agent is selected from the group consisting of fluorinated ethylene propylene copolymer, perfluoroalkoxy polymer and mixtures thereof.

12. The process of claim 1 wherein the oxygen-containing atmosphere is air.

13. The process of claim 11 wherein the oxygen-containing atmosphere is air.

14. The process of claim 6 wherein the porous material is exposed to the air at a temperature of from about 480° F. to about the melting point of the binding agent.

15. The process of claim 14 wherein the porous material is exposed to said air for at least about 48 hours.

16. The process of claim 15 wherein the porous material is exposed to said air at a temperature from about 480° F. to about 550° F., for a period of time from about 48 to about 192 hours.

17. The process of claim 16 wherein the binding agent is selected from the group consisting of fluorinated ethylene propylene copolymer, perfluoroalkoxy polymer and mixtures thereof.

18. The process of claim 17 wherein the wetting agent includes a nonionic surfactant.

19. The process of claim 18 wherein the wetting agent includes a ethoxylated alkyl phenol.

20. The process of claim 16 wherein the bonded fluorocarbon fibers had been subjected to bleaching prior to being incorporated into the porous material.

21. The process of claim 20 wherein the porous material is in the form of a loosely rolled structure.

22. The method of claim 1 wherein the atmosphere is filtered prior to exposure to the porous material.

23. The method of claim 20 wherein the atmosphere is filtered prior to exposure to the porous material.

24. The method of claim 1 wherein the porous material is a woven fabric comprising polytetrafluoroethylene fibers and the woven fabric is exposed to said atmosphere for a period of time sufficient to reduce the level of ionic extractables to 35 ppb/ft$^2$ or less.

25. The method of claim 23 wherein the porous material is exposed to said atmosphere for a period of time sufficient to reduce the level of ionic extractables to no more than about 35 ppb/ft$^2$.

26. In a method for making a porous material comprised of fluorocarbon fibers that have been bonded with a binder composition that contains ionic extractables, the improvement comprising reducing the level of said ionic extractables by exposing said porous material to a heated oxygen-containing atmosphere for a period of time that is sufficient to reduce the level of said ionic extractables.

27. A method for treating a porous structure to render it non-contaminating, the porous structure being comprised of fluorinated polymer fibers and a fluorinated binder, the method comprising the steps of: filtering and heating air to a temperature of at least 400° F.; thermally isolating the porous structure in a chamber; exposing the thermally isolated porous structure to the heated air for at least several hours; vigorously agitating the air within the chamber during the exposure of the porous structure; and maintaining the temperature of the air within the chamber to at least the selected temperature.

28. The method according to claim 27 wherein the fluorinated binder is selected from the group consisting of fluorinated ethylene propylene copolymer, perfluoroalkoxy polymer and mixtures thereof.

29. The method of claim 27 further comprising supporting the filter on a non-metallic surface within the thermally isolated chamber, heating the air with an electrical heating element, distributing the heated air within the chamber with baffles.

30. The method according to claim 29 wherein the filter element is supported on a sheet of porous fluoropolymer.

31. The method according to claim 29 wherein the filter element contains total extractables including nitrate of no more than about 35 ppb/ft$^2$.

32. The method according to claim 29 wherein the air is heated to a temperature ranging from 480° to 550° F.

33. The method according to claim 29 wherein the air is heated to a temperature of approximately 535° F.

34. The method according to claim 33 wherein the filter element is heated in the chamber for a time ranging from 48 to 192 hours.

35. The method according to claim 29 wherein the air is vigorously agitated with propeller type fans.

36. A fibrous porous structure comprising fluorinated polymeric fibers bonded with a binder selected from the group consisting of fluorinated ethylene propylene copolymer, perfluoroalkoxy polymer and mixtures thereof, wherein the porous structure has a total extractables level of less than about 53 ppb/ft$^2$.

37. The bleached fibrous porous structure according to claim 36 wherein the binder comprises up to 45% of the weight of the fibers.

38. The bleached fibrous porous structure according to claim 36 where the total extractables level is less than about 35 ppb/ft$^2$.

39. The bleached fibrous porous structure according to claim 36 wherein the fluorinated polymeric fibers are woven, bleached and pre-shrunk before being bonded with the binder to form the porous structure.

40. A non-contaminating fibrous porous structure comprising bleached and pre-shrunk fluorinated polymeric fibers and a fluorinated binder wherein said porous fibrous structure is white, retains the whiteness at service temperatures in excess of 250° F., and has a total extractables level of less than about 53 ppb/ft$^2$.

41. The non-contaminating fibrous porous structure according to claim 40 wherein the binder is selected from the group consisting of fluorinated ethylene propylene polymer, perfluoroalkoxy polymer and mixtures thereof.

42. The non-contaminating fibrous porous structure according to claim 41 wherein the total extractables level is no more than about 35 ppb/ft$^2$.

43. A process for reducing the level of extractables in a porous material comprised of bonded fluorocarbon fibers and a fluorocarbon binding agent, comprising exposing the porous material to an oxygen-containing atmosphere, which is maintained at a temperature of from about 400° F. to about the melting point of the binding agent, for a period of time sufficient to reduce the level of ionic and carbonaceous extractables in the porous material.

44. The process of claim 1 wherein the fluorocarbon fibers comprise polytetrafluoroethylene.

45. The process of claim 1 wherein the porous material is exposed to the oxygen-containing atmosphere for a period of time of from about 48 to about 336 hours.

46. The fibrous porous structure of claim 36 wherein the fluorinated polymeric fibers comprise polytetrafluoroethylene.

* * * * *